(12) United States Patent
Kyle et al.

(10) Patent No.: US 10,559,231 B2
(45) Date of Patent: Feb. 11, 2020

(54) SIGN POST MOUNTING APPARATUS

(71) Applicant: FOX VALLEY REALTY SIGN LLC, Batavia, IL (US)

(72) Inventors: John Kyle, Batavia, IL (US); Ruben Aburto, Winfield, IL (US)

(73) Assignee: FOX VALLEY REALTY SIGN LLC, Batavia, IL (US)

( * ) Notice: Subject to any disclaimer, the term of this patent is extended or adjusted under 35 U.S.C. 154(b) by 0 days.

(21) Appl. No.: 15/424,805

(22) Filed: Feb. 4, 2017

(65) Prior Publication Data

US 2017/0301265 A1 Oct. 19, 2017

Related U.S. Application Data

(60) Provisional application No. 62/323,985, filed on Apr. 18, 2016.

(51) Int. Cl.
*G09F 7/18* (2006.01)
*F16B 2/06* (2006.01)
*E04H 12/22* (2006.01)

(52) U.S. Cl.
CPC .............. *G09F 7/18* (2013.01); *F16B 2/065* (2013.01); *E04H 12/223* (2013.01); *E04H 12/2215* (2013.01); *E04H 12/2223* (2013.01); *E04H 12/2269* (2013.01); *E04H 12/2284* (2013.01); *G09F 2007/1813* (2013.01)

(58) Field of Classification Search
CPC ..... G09F 2007/1804; G09F 2007/1813; G09F 2007/1817; G09F 7/18; E04H 12/2215; E04H 12/2284; E04H 12/2269; E04H 12/2223; E04H 12/223

USPC .... 248/156, 218.4, 250, 300, 530, 525, 527, 248/523, 524; 52/155, 160, 165, 166
See application file for complete search history.

(56) References Cited

U.S. PATENT DOCUMENTS 574,641 A * 1/1897 Streator .............. E04H 12/2292
256/54
1,650,177 A * 11/1927 Arnold ...................... G09F 7/18
40/607.11

(Continued)

FOREIGN PATENT DOCUMENTS

CA 2080806 A1 * 4/1994 ............... G09F 7/18
CA 2287154 A1 * 4/2001 ......... E04H 12/2215

(Continued)

OTHER PUBLICATIONS

John Kyle; "Sign Post Mounting Apparatus" 4 pages containing pictures of apparatus in use before Mar. 18, 2015.

(Continued)

*Primary Examiner* — Eret C McNichols
(74) *Attorney, Agent, or Firm* — James Conte

(57) ABSTRACT

A sign post mounting apparatus having a stake coupled to a carrier. The carrier has a sidewall with a plurality of sections, each section is adjacent to two other sections. A first pair of the plurality of sidewall sections are seamlessly coupled to each other and are formed from a seamless sheet; a second pair of the plurality of sidewall sections are seamlessly coupled to each other and formed from a seamless sheet; the first pair of sidewall sections are coupled to the second pair of sidewall sections along a first seam and along a second seam.

7 Claims, 7 Drawing Sheets

(56) References Cited

U.S. PATENT DOCUMENTS

| | | | | |
|---|---|---|---|---|
| 4,120,125 A * | 10/1978 | Cvetan | ............... | E04H 12/2215 52/156 |
| 4,271,646 A * | 6/1981 | Mills | ............... | E04H 12/2215 52/165 |
| 4,588,157 A * | 5/1986 | Mills | ............... | E04H 12/2215 248/530 |
| 4,860,940 A * | 8/1989 | Mills | ............... | E04H 12/2215 228/173.4 |
| 5,465,529 A * | 11/1995 | Park | ............... | A47G 33/12 248/524 |
| 5,568,909 A * | 10/1996 | Timko | ............... | E04H 12/2261 248/519 |
| 5,695,166 A * | 12/1997 | Watts | ............... | E04H 12/2269 248/300 |
| 5,927,677 A * | 7/1999 | Speece | ............... | E04H 12/2215 248/516 |
| 6,039,298 A * | 3/2000 | Stier | ............... | A47G 29/1216 248/156 |
| 6,142,441 A * | 11/2000 | Vannucci | ............... | A47G 33/12 248/519 |
| 6,308,926 B1 * | 10/2001 | Meyer | ............... | E04H 12/2215 248/530 |
| 6,340,147 B1 * | 1/2002 | Dymarczyk | ............... | E04H 12/2269 248/156 |
| 6,402,115 B1 * | 6/2002 | Groff | ............... | B29C 45/14426 248/156 |
| 6,745,990 B2 * | 6/2004 | Groff | ............... | B29C 45/14426 248/156 |
| 6,886,296 B1 * | 5/2005 | John | ............... | E04H 12/2292 248/519 |
| 7,134,636 B2 * | 11/2006 | Callies | ............... | E04H 12/2215 248/156 |
| 7,152,841 B2 * | 12/2006 | Callies | ............... | E04H 12/2215 248/156 |
| 7,730,675 B2 * | 6/2010 | Hill | ............... | E04H 12/2215 248/530 |
| 8,082,702 B2 * | 12/2011 | Hill | ............... | E02D 5/80 52/155 |
| 8,322,678 B2 * | 12/2012 | Zhu | ............... | E04H 12/2215 248/156 |
| 8,523,134 B2 * | 9/2013 | Walker | ............... | E04H 12/2215 248/156 |
| 8,590,856 B2 * | 11/2013 | Zhu | ............... | E04H 12/2215 248/156 |
| 8,668,175 B2 * | 3/2014 | Koleszar | ............... | H05K 7/1488 108/106 |
| 9,145,706 B2 * | 9/2015 | Lee | ............... | E02D 7/22 |
| 9,732,540 B1 * | 8/2017 | Jansen | ............... | E04H 17/22 |
| 2008/0104898 A1 * | 5/2008 | Hill | ............... | E04H 12/2269 52/165 |
| 2009/0090836 A1 * | 4/2009 | Harris | ............... | E04H 12/2238 248/530 |
| 2014/0020310 A1 * | 1/2014 | Lee | ............... | E02D 7/22 52/157 |
| 2015/0108318 A1 * | 4/2015 | Orr | ............... | F16M 11/32 248/523 |
| 2016/0022082 A1 * | 1/2016 | Pellegrini | ............... | A47G 33/1226 248/523 |
| 2016/0237712 A1 * | 8/2016 | Finnegan | ............... | E04H 12/2292 |
| 2019/0063102 A1 * | 2/2019 | Writesman | ............... | E04H 12/2215 |

FOREIGN PATENT DOCUMENTS

| | | | | |
|---|---|---|---|---|
| CA | 2286930 C | * | 12/2003 | ......... E04H 12/2215 |
| DE | 29508514 U1 | * | 9/1995 | ......... E04H 12/2238 |
| DE | 19953904 C1 | * | 9/2001 | ............... A01G 9/16 |
| DE | 202015105497 U1 | * | 11/2015 | ............ E04H 17/22 |
| EP | 0120643 A2 | * | 10/1984 | ......... E04H 12/2215 |
| GB | 2322877 A | * | 9/1998 | ......... E04H 12/2215 |

OTHER PUBLICATIONS 4 pages of pictures of apparatus purchased from the Home Depot before Mar. 18, 2015.
Feb. 8, 2016; John Kyle, Compilation of Sign Post Spikes.

* cited by examiner

SIGN POST MOUNTING APPARATUS

CROSS REFERENCE TO RELATED APPLICATIONS

The present application claims domestic priority to provisional application 62/323,985 filed Apr. 18, 2016. The present application is a non-provisional filing thereof. The provisional application is incorporated herein in its entirety by reference.

FIELD

The present disclosure concerns a sign post mounting apparatus having a stake coupled to a carrier.

BACKGROUND

Systems for mounting mailbox posts in the ground are known. One such system has a stake coupled to a carrier. The carrier has a sidewall with four distinct sections. Each section is adjacent to two other sections and normal to the two other sections. The four sections provide a square perimeter delimiting a hollow. The hollow receives the mailbox post. One of the four sections has a gap forming a split along a length of the section's height. Adjustable threaded fasteners join the portions of this section split by the gap. Tightening the fasteners reduces the width of the gap contracting the perimeter formed by the four sections. The contraction fixes the portion of the post inserted into the carrier inside the carrier and fixes the post relative to the stake.

SUMMARY

Surprisingly the above system does not work well with realty sign posts. The posts of the realty sign, after fixed in the carrier, tilts over time relative to the stake portion and ground holding the stake. Also the stake breaks from the carrier.

An embodiment of the present invention provides a post mounting apparatus especially useful for realty sign posts and in particular 4×4 posts. The apparatus holds the post so it does not tilt as much over time relative to the stake portion or the ground. Accordingly it does not tilt as much over time relative to its installation position. Also the stake remains better coupled to the carrier. The embodiment allows for the 4×4 post to be plumbed vertically in all four directions In one example of the invention the sign post mounting apparatus has a carrier that has a first end which is an open end which opens up into a hollow of the carrier. The carrier has a second end opposite the first end. The second end comprises a base wall of the carrier. The base wall delimits a plurality of through openings adapted to allow water to drain through the carrier.

The carrier has a sidewall with a plurality of sections, each section is adjacent to two other sections; each sidewall section delimits a separate one of said through openings; each sidewall section has a separate respective one of a plurality of first through openings and a separate respective one of a plurality of second through openings. A separate one of a plurality of fasteners is in each first and second through openings. Each fastener has an abutment in the hollow.

A first pair of the plurality of sidewall sections are seamlessly coupled to each other and are formed from a seamless sheet. The sheet is preferably metal. A second pair of the plurality of sidewall sections are seamlessly coupled to each other and formed from a seamless sheet. The sheet is preferably metal.

The first pair of sidewall sections are coupled to the second pair of sidewall sections along a first seam and along a second seam. The first seam extends along a first side surface of the first pair of sidewall sections and along a first side surface of the second pair of sidewall sections. The second seam extends along a second side surface of the first pair of sidewall sections and along a second side surface of the second pair of sidewall sections.

A stake is coupled to the base wall.

BRIEF DESCRIPTION OF THE DRAWINGS

Further features of the present invention will become more apparent from reading the following description with reference to the accompanying drawings in which.

Figure 1:
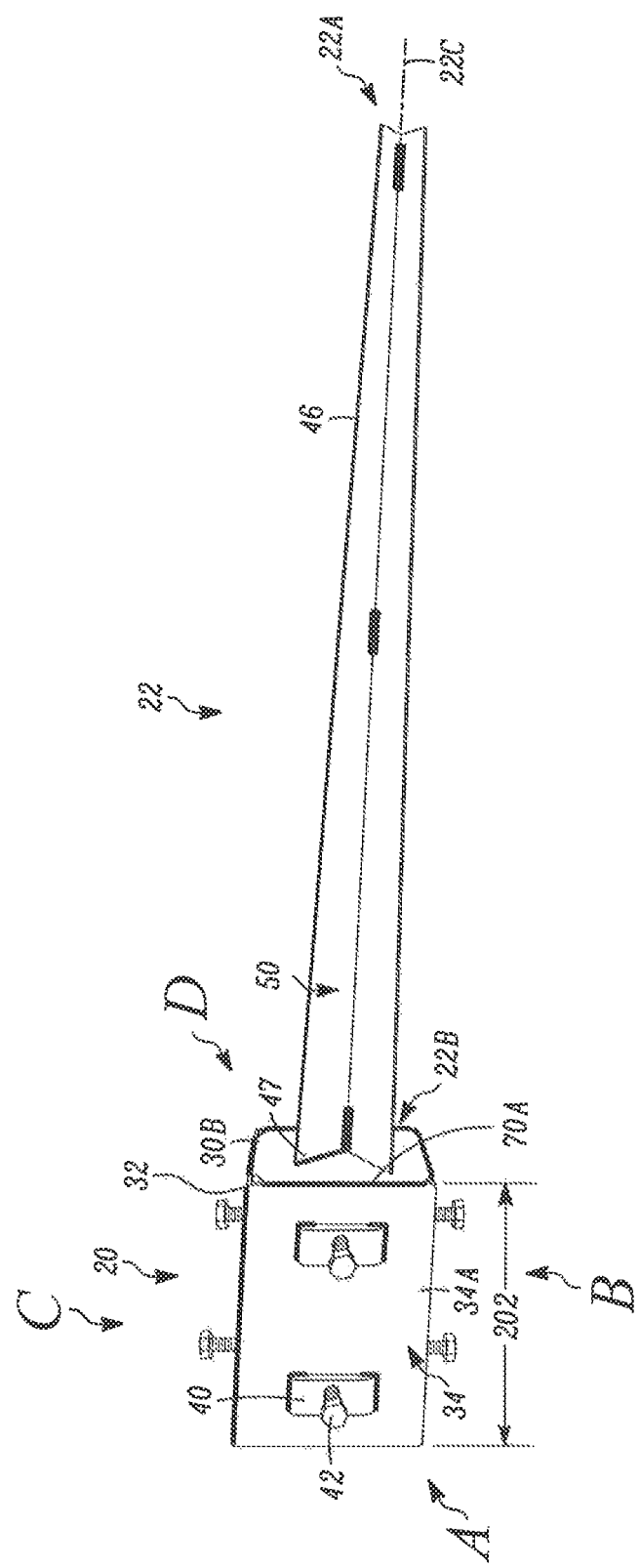
FIG. 1 is a first side view A of a sign post mounting apparatus embodying features of the present invention.
Figure 2:
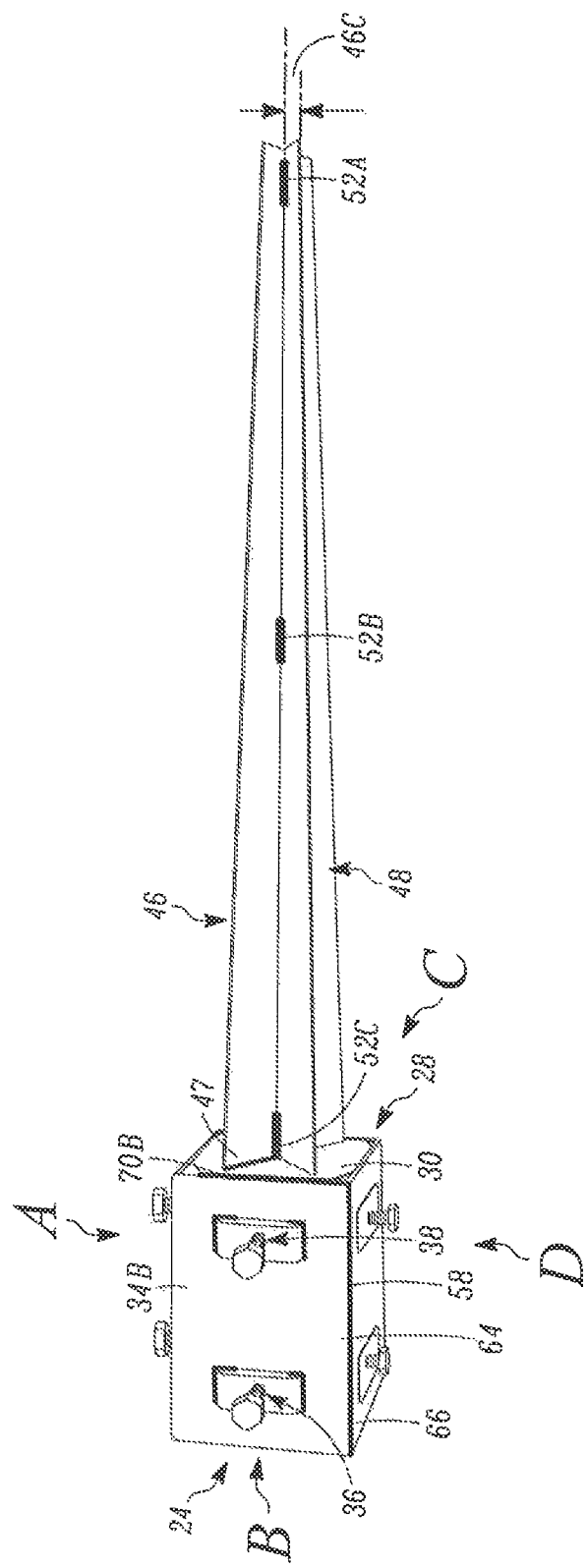
FIG. 2 is a second side view B of the sign post mounting apparatus of FIG. 1.
Figure 3:
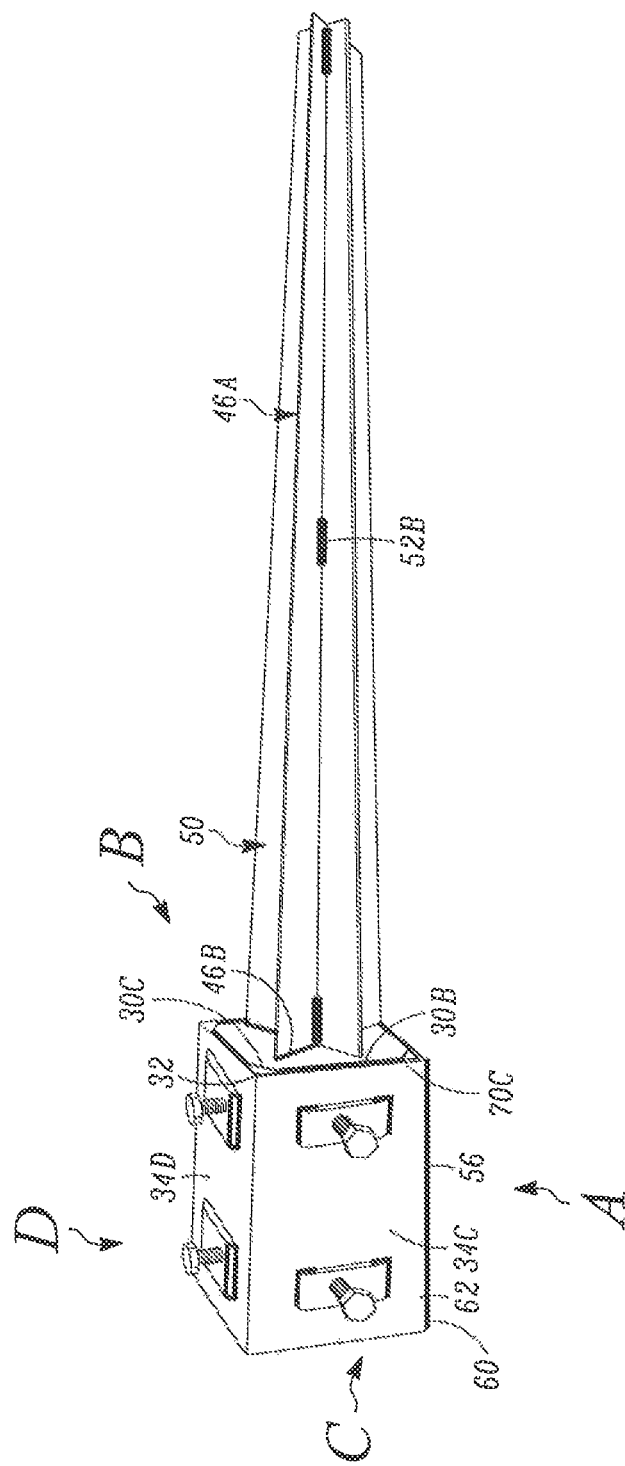
FIG. 3 is a third side view C of the sign post mounting apparatus of FIG. 1.
Figure 4:
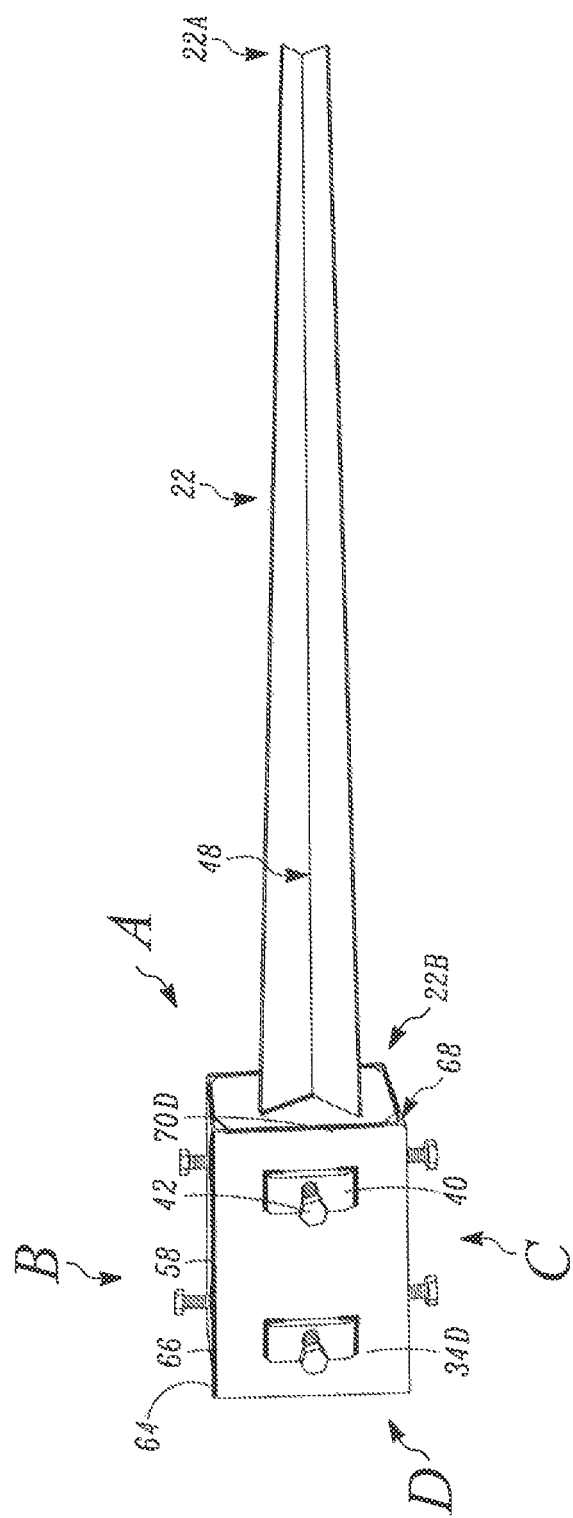
FIG. 4 is a fourth side view D of the sign post mounting apparatus of FIG. 1.
Figure 5:
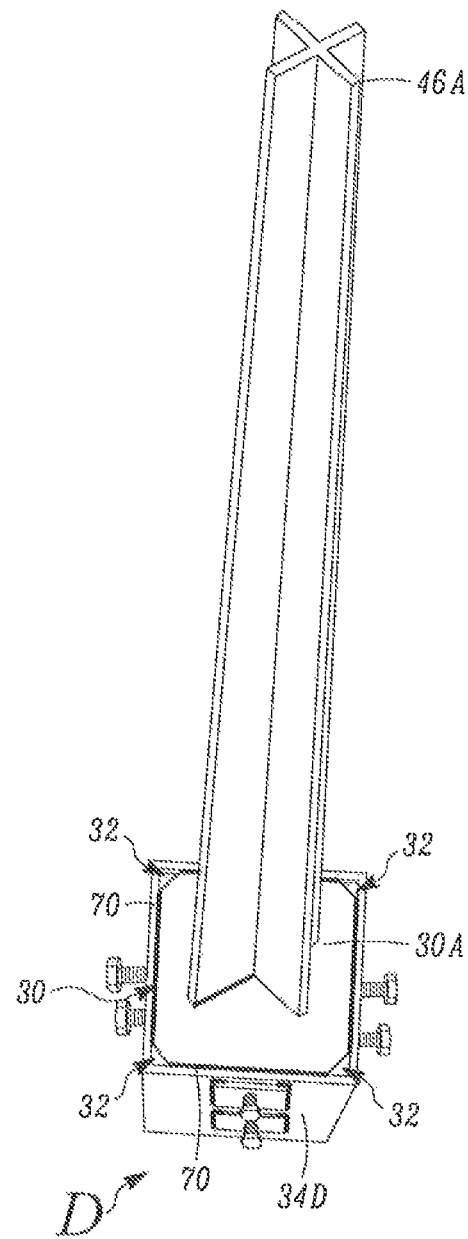
FIG. 5 is a bottom and side view D of the sign post mounting apparatus of FIG. 1
Figure 6:
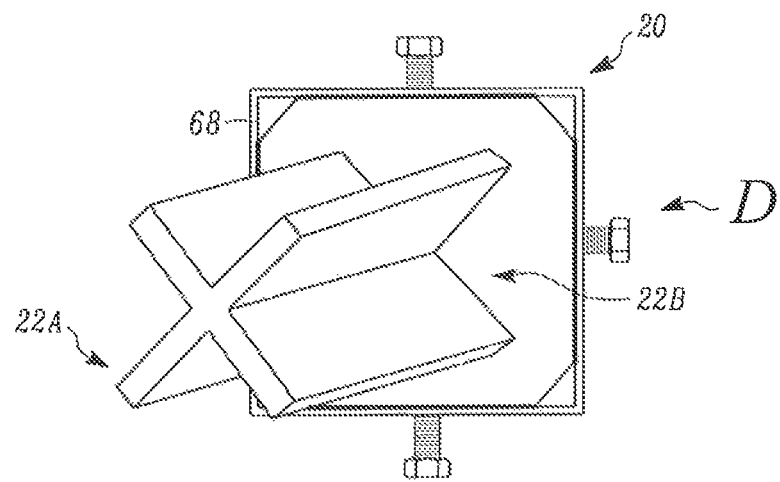
FIG. 6 is a bottom view of the sign post apparatus of FIG. 1 looking into the stake.
Figure 7:
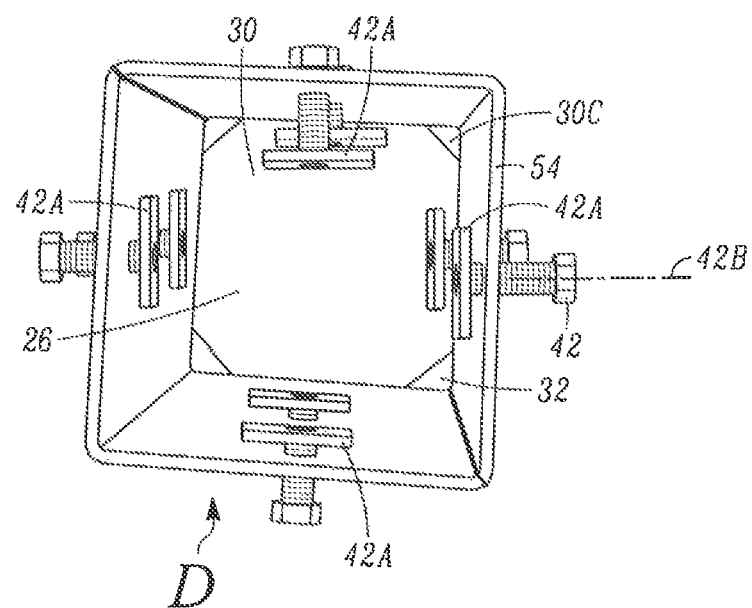
FIG. 7 is a top view of the sign post apparatus of FIG. 1 looking into the hollow of the carrier.
Figure 8:
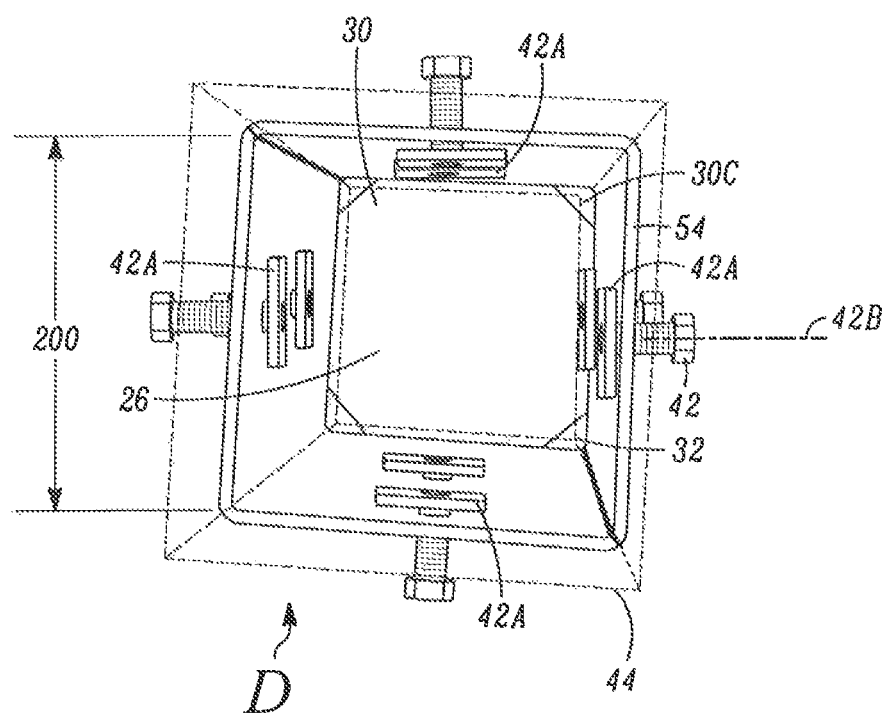
FIG. 8 is the top view of the sign post apparatus of FIG. 7 with a sign post shown in dashed lines disposed in the carrier.

Before any embodiments of the invention are explained in detail, it is to be understood that the invention is not limited in its application to the details of construction and arrangement of components set forth in the following description or as illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

An example of a sign post mounting apparatus embodying the present invention has a carrier 20 coupled to a stake 22. The carrier has a first end 24 which is an open end which opens up into a hollow 26 of the carrier. The open end 24 is preferably a mouth to receive a portion of a preferably 4×4 inch realty sign post. The carrier has a second end 28 opposite the first and 24. The second end 28 comprises a base wall 30 of the carrier 20. The base wall 30 delimits a plurality of through openings 32 adapted to allow water to drain through the carrier.

The carrier 20 has a sidewall 34 with four sections 34A-34D. Each section is adjacent to two other sections and perpendicular to the two other sections. The four sections provide a squared perimeter delimiting the hollow 26. The hollow is delimited to preferably receive a 4×4 inch free end of a realty sign post. The sidewall 34 has a plurality of first through openings 36 extending there through and plurality of second through openings 38 extending there through. Each sidewall section 34A-34D has a separate respective one of the plurality of first through openings 36 and a separate respective one of the plurality of second through openings 38. A portion of each opening is threaded. The threaded portion opens through a boss. Thus each through hole in part is delimited by a respective separate boss 40 which in this case is a weld nut. Each sidewall section 34A-34D has one of the plurality of first through openings and one of the plurality of second through openings. Each boss 40 can be considered a part of the sidewall 34. Each boss 40 can be seamless with the section of the sidewall to which it is coupled or it can be seamed to the section of the sidewall to which it is coupled by way of for instance a weld.

A separate respective fastener 42 extends through each first through opening 36 and each second through opening 38. Each fastener 42 at an end extending into the hollow has an abutment 42a. In this case the abutment comprises a weld nut. Each fastener 42 is variably adjustable along its longitudinal axis 42B to variably extend into the hollow 26. Each fastener 42 serves as a clamp part to clamp the portion of the 4×4 sign post 44 inserted into the hollow fixedly in place in the hollow. The fasteners 42 fix the post in place relative to the stake 22. Each fastener 42 is operated by rotating the fastener so it adjusts to further extend longitudinally into the hollow. Each fastener is rotated to adjust it longitudinally inward into the hollow until each abutment 42A of each fastener 42 forcibly abuts up against an external surface of the post 44 in the hollow 26. Each abutment has a longitudinal length along its major axis that is at least 25 mm. Each sidewall section 34A-34D has a width 200, measured in the interior of the hollow, of between 4.3 and 5 inches. The width is preferably between 4.33 and 4.4 inches. The length 202 of each sidewall section, measured in the interior of the hollow, is between 5-7 inches and preferably 6 inches.

The stake 22 has a first end 22A which is a free end. The stake has an opposite second end 22B. The stake is coupled to the carrier base wall 30 at the stake's second end 22B. The stake has a plurality of blades 46. There are preferably four blades. Each blade has a longitudinal length which extends along a longitudinal axis 22C of the stake from the stake's first end 22A to the stake's second end 22B. Each blade has a first lateral length at the first end 22A which extends from the longitudinal axis 22C laterally to a longitudinally extending free end 46A of the blade. Each blade has a second lateral length at the second end 22B. The second lateral length extends laterally from the longitudinal axis 22C to the longitudinally extending free end 46A of the blade. The second lateral length is greater than the first lateral length. The second lateral length of each blade is from 40 70 mm and preferably greater than 60 mm. The stake 22 maybe rotated 45 degrees so the blades of the stake point between the corners of the carrier. Each blade at the second end 22C has a laterally extending end surface 46B which extends along the blade's second lateral length and has a length equal to the second lateral length. The second end 22C of the stake fits within a smallest circumferential perimeter or envelope which has a diameter of X. The carrier first end fits within a smallest circumferential perimeter or envelope having a diameter of Y. In the formula X/Y=Z, Z is always greater than 0.20 The abutment 42A has a length U. In the formula U/Y=Q, Q is always greater 0.2 and preferably greater than 0.22. Each blade 46 is coupled to an external face surface 30A of the base wall 30 along each blade's laterally extending side surface 46B and along its second lateral length. A separate seam 47 for each blade extends at least ⅘ of the second lateral length of the respective blade and preferably the entire second lateral length of the respective blade. The seam is a weld. Each blade has a width 46C of at least 2.5 and preferably 3 mm. Each blade is preferably made of steel.

A first pair of blades 48 of the plurality of blades 46 is seamlessly coupled to each other. The first pair of blades is made from a seamless cut sheet of metal. A second pair of blades 50 of the plurality of blades 46 is seamlessly coupled to each other. The second pair of blades 50 is made from a seamless cut sheet of metal. The first pair of blades 48 is coupled to the second pair of blades 50 along the longitudinal axis 22C. There are at least three seams 52A, 52B, 52C coupling the first pair 48 to the second pair 50. One seam 52A extends from the first end of the stake towards a central portion of the stake along the longitudinal axis 22C. Another seam 52B extends from the central portion of the stake along the longitudinal axis towards the first and second end. A third seam 52C extends from the second end of the stake towards the central region along the longitudinal axis 22C. Each seam 52A-52C has a length measured along the direction of the longitudinal axis 22C of L. The stake has a length measured along the direction of longitudinal axis 22C of S. In the formula L/S=B, B is greater than 0.05.

In more detail, the carrier 20 receives the free end portion 44 of the post and fixedly couples the post to the stake 22. The first end 24 of the carrier is bounded by a first end surface 54 at the carrier first end. The first end surface is also a first end surface 54 of the sidewall 34 and at a first end of the sidewall. A first pair of sidewall sections, 34A, 34B, are seamlessly coupled to each other and are formed from a seamless sheet of cut metal. A second pair of sidewall sections, 34C, 34D, are seamlessly coupled to each other and formed from a seamless sheet of cut metal. The first pair of sidewall sections are coupled to the second pair of sidewall sections. The sections are coupled to each other along a first seam 56 and along a second seam 58. Sidewall section 34B is coupled to sidewall section 34D along the first seam 56. Sidewall section 34A is coupled to sidewall section 34C along the second seam 58. The first seam 56 extends along a first side surface 60 of the first pair of sidewall sections and along a first side surface 62 of the second pair of sidewall sections. The first seam 56 is a weld. The second seam 58 extends along a second side surface 64 of the first pair of sidewall sections and along a second side surface 66 of the second pair of sidewall sections. The seam 58 is also a weld.

The base wall 30 is coupled to the sidewall 34 along a sidewall second end surface 68. The sidewall second end surface 68 is at the sidewall second end. The base wall 30 is coupled to the second sidewall surface 68 along the base wall's side surface 30B. The coupling is along a plurality of seams, 70A, 70B, 70C, 70D, the seams are welds. A portion of the side surface 30B of the base wall is coupled along a first seam 70A to the second end surface 68 at the first sidewall section 34A. Another portion of the base wall side surface 30B is coupled along a second seam 70B of the second end surface 68 at the second sidewall section 34B. A portion of the base wall side surface 30B is coupled along a third seam 70C to the second end surface 68 at the third sidewall section 34C. A further portion of the base wall side surface 30B is coupled along a fourth seam 70D to the second end surface 68 at the fourth sidewall section 34D.

There is a plurality of through openings 32 at each of the four corners of the sidewall 34 at the carrier second end 28. Each opening 32 is delimited by the base wall 30 and more particularly the base wall side surface 30B. Each opening is delimited by an angled side surface portion 30C. The angled side surface portion for a respective opening is angled with a sidewall section at an angle less than 90 degrees. The angled side surface 30C for the respective opening is also angled with a second sidewall section at an angle of less than 90 degrees. Each through opening 32 is also delimited by a separate one of the sidewall sections. Although the embodiment is described as a reality sign post, it could be used for other posts inserted into the ground.

The invention claimed is:

1. A sign post mounting apparatus for mounting a 4×4 sign post comprising:
   a carrier has a first end which is an open end which opens up into a hollow of the carrier; the carrier has a second end opposite the first end; the second end comprises a base wall of the carrier; the base wall delimits a plurality of base wall through openings adapted to allow water to drain through the carrier;
   the carrier has a sidewall with a plurality of sections, each section is adjacent to two other sections, said carrier has a first and second seam; the first seam extends along a first side surface of a first pair of sidewall sections and along a first side surface of a second pair of sidewall sections, the second seam extends along a second side surface of said first pair of sidewall sections and along a second side surface of the second pair of sidewall sections, said first seam is opposite said second seam;
   said first pair of sidewall sections are coupled to each other at a seamless bend greater than 40 degrees, said first pair of sidewall sections are a first sidewall section and a second side wall section;
   said second pair of sidewall sections are coupled to each other at a seamless bend greater than 40 degrees, said second pair of sidewall sections are a first sidewall section and a second side wall section;
   a separate one of a plurality of fasteners extends through an opening in a separate one of each first and second sidewall sections; each fastener has an abutment in the hollow; an abutment of said abutments has a length along its major axis that is greater than the diameter of a portion of the fastener adjacent the abutment;
   a stake is coupled to the base wall;
   wherein said hollow is sized to receive a 4×4 post, and wherein said 4×4 post is able to be plumbed relative to the hollow in at least two directions when the post is received in the hollow.

2. The sign post mounting apparatus of claim 1 wherein each fastener has a longitudinal axis and is variably adjustable along its longitudinal axis to variably extend into the hollow.

3. The sign post mounting apparatus of claim 1 wherein each fastener serves as a clamp part to clamp a portion of the 4×4 inch sign post inserted into the hollow fixedly in place in the hollow.

4. The sign post mounting apparatus of claim 1 wherein the base wall has a plurality of side surfaces, the base wall is coupled to a surface of the sidewall along the plurality of side surfaces of the base wall; the coupling is along a plurality of seams.

5. The sign post mounting apparatus of claim 1, wherein the carrier first end fits within a smallest circumferential envelope having a diameter Y, the abutment of said abutments, along its major axis, has a length U, in the formula U/Y=Q, Q is greater than 0.2.

6. The sign post mounting apparatus of claim 1, wherein the abutment of said abutments is a weld nut.

7. A method of making a sign post mounting apparatus for mounting a 4×4 sign post comprising:
   forming from a first sheet of metal first pair of sidewall sections coupled to each other along a seamless bend greater than 40 degrees, one of said sidewall sections of said first pair having a first pair of corners, another of said sidewall sections of said first pair having a second pair of corners;
   forming from a second sheet of metal a second pair of sidewall sections coupled to each other along a seamless bend greater than 40 degrees, one of said sidewall sections of said second pair having a third pair of corners, another of said sidewall sections of said second pair having a fourth pair of corners;
   welding the first pair of sidewall sections to the second pair of sidewall sections along a first side surface and said first pair of corners of the first pair of sidewall sections and along a first side surface and said third pair of corners of the second pair of sidewall sections;
   welding the second pair of sidewall sections to the first pair of sidewall sections along a second side surface and said second pair of corners of the first pair of sidewall sections and along a second side surface and said fourth pair of corners of the second pair of sidewall sections to form a structure;
   providing said structure with an open end which opens into a hollow;
   providing a base wall at a second end of the structure;
   delimiting with said base wall a plurality of base wall through openings adapted to allow water to drain through said openings;
   disposing a separate one of a plurality of fasteners through an opening in each sidewall section; an abutment of at least one fastener has a length along its major axis that is greater than the diameter of a portion of the fastener adjacent the abutment;
   sizing said carrier to receive a 4×4 sign post, said sizing providing clearance between an exterior surface of said sign post and an interior surface of said carrier, wherein said post is able to be plumed in at least two directions; and
   coupling a stake to the base wall.

* * * * *